United States Patent
Kil et al.

(10) Patent No.: US 8,660,619 B2
(45) Date of Patent: Feb. 25, 2014

(54) APPARATUS AND METHOD FOR REPLACING A BATTERY IN A PORTABLE TERMINAL

(75) Inventors: Kwang-Min Kil, Gyeonggi-do (KR); Hae-Jun An, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 108 days.

(21) Appl. No.: 13/495,294

(22) Filed: Jun. 13, 2012

(65) Prior Publication Data

US 2012/0322431 A1 Dec. 20, 2012

(30) Foreign Application Priority Data

Jun. 14, 2011 (KR) .................. 10-2011-0057684

(51) Int. Cl.
 *H04M 1/00* (2006.01)
 *H04B 1/38* (2006.01)
(52) U.S. Cl.
 USPC .................. 455/574; 455/550.1; 455/572
(58) Field of Classification Search
 USPC .............. 455/343.6, 418, 572, 550.1, 574
 See application file for complete search history.

(56) References Cited

U.S. PATENT DOCUMENTS

| | | | |
|---|---|---|---|
| 5,036,532 A * | 7/1991 | Metroka et al. | 455/572 |
| 5,287,013 A * | 2/1994 | Adair | 307/328 |
| 5,733,673 A * | 3/1998 | Kunert | 429/1 |
| 5,739,596 A * | 4/1998 | Takizawa et al. | 307/66 |
| 5,832,282 A * | 11/1998 | Pate et al. | 307/66 |
| 5,959,368 A | 9/1999 | Kubo et al. | |
| 6,452,362 B1 | 9/2002 | Choo | |
| 2004/0143405 A1* | 7/2004 | Tsai et al. | 702/63 |
| 2008/0293456 A1* | 11/2008 | Chang et al. | 455/572 |
| 2009/0284225 A1* | 11/2009 | Nakanuma et al. | 307/80 |
| 2010/0128449 A1* | 5/2010 | Mangaroo | 361/752 |

FOREIGN PATENT DOCUMENTS

| | | | |
|---|---|---|---|
| EP | 0525800 A2 * | 7/1992 | G06F 1/26 |
| KR | 10-2006-0025451 A | 3/2006 | |
| KR | 10-2009-0020837 A | 2/2009 | |

\* cited by examiner

*Primary Examiner* — Wesley Kim
(74) *Attorney, Agent, or Firm* — Cha & Reiter, LLC

(57) ABSTRACT

An apparatus and method for replacing a battery in a portable terminal are provided, in which there are a main battery and an auxiliary battery, a cover removal sensor senses the removal of a battery cover, and a controller switches from the main battery to the auxiliary battery for supplying a power in response to the battery cover removal, wherein the auxiliary battery supplies the power to some component of the portable terminal under the control of the controller.

5 Claims, 5 Drawing Sheets

APPARATUS AND METHOD FOR REPLACING A BATTERY IN A PORTABLE TERMINAL

CLAIM OF PRIORITY

This application claims priority under 35 U.S.C. §119(a) to a Korean Patent Application filed in the Korean Intellectual Property Office on Jun. 14, 2011 and assigned Serial No. 10-2011-0057684, the contents of which are incorporated herein by reference.

BACKGROUND OF THE INVENTION

1. Field of the Invention

The present invention relates to a portable terminal, and more particularly, to an apparatus and method for replacing a battery in a portable terminal.

2. Description of the Related Art

Portable terminals such as smart phones and tablet PCs provide many useful functions to users through a variety of applications. Therefore, the portable terminals have evolved to provide various types of services and information beyond the traditional voice communication service.

Along with the diversification of functions in portable terminals, users manipulate their portable terminals more which in turn cause an increase in battery power consumption. Accordingly, the users frequently have to replace the batteries.

To replace a battery, a user must turn off his or her portable terminal. However, the power-off of the portable terminal results in termination of all on-going services in the portable terminal.

SUMMARY OF THE INVENTION

An aspect of embodiments of the present invention is to address at least the problems and/or disadvantages and to provide at least the advantages described below. Accordingly, an aspect of embodiments of the present invention is to provide a method and apparatus for replacing a battery without power-off in a portable terminal.

Another aspect of embodiments of the present invention is to provide a method and apparatus for continuously providing a specific service even though a battery is replaced during the specific service in progress in a portable terminal.

In accordance with an embodiment of the present invention, there is provided an apparatus for replacing a battery in a portable terminal, in which there are a main battery and an auxiliary battery, a cover removal sensor senses the removal of a battery cover, and a controller switches from the main battery to the auxiliary battery for supplying a power in response to the battery cover removal, wherein the auxiliary battery supplies the power to some component of the portable terminal under the control of the controller.

In accordance with another embodiment of the present invention, there is provided a method for replacing a battery in a portable terminal, in which a removal of a battery cover is sensed, a power is switched from the main battery to an auxiliary battery in response to the battery over removal, wherein the auxiliary battery supplies the power to some component of the portable terminal under the control of the controller.

BRIEF DESCRIPTION OF THE DRAWINGS

The above features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

Figure 1:
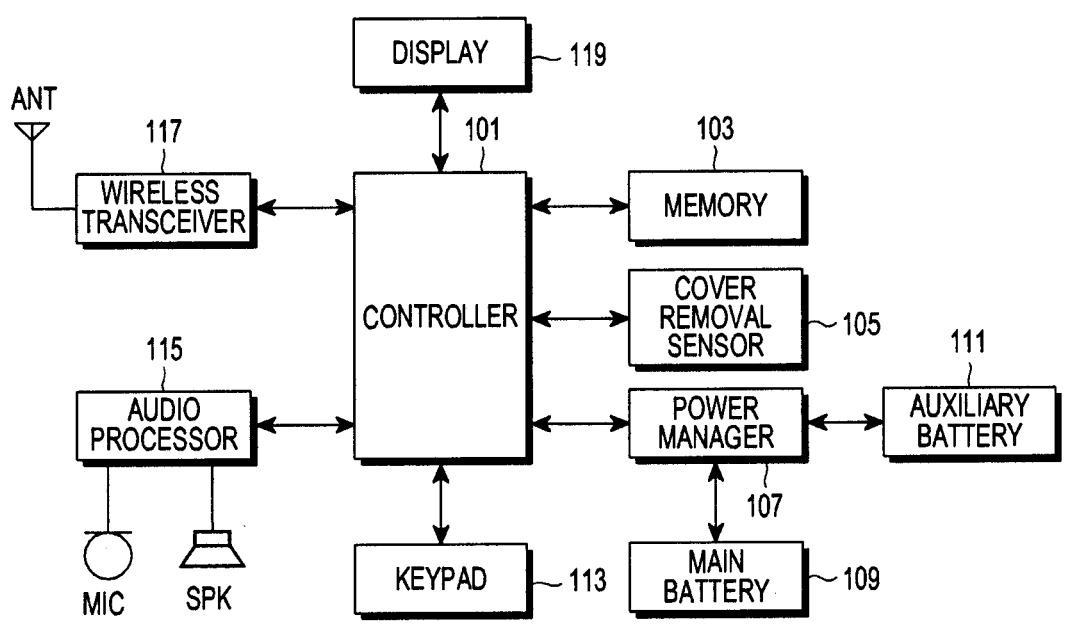
FIG. 1 is a block diagram of a portable terminal according to an embodiment of the present invention.

Reference will be made to the preferred embodiment of the present invention with reference to the attached drawings. Like reference numerals denote components having substantially the same function through the specification and the drawings. A detailed description of known functions and operations will not be given lest it should obscure the subject matter of the present invention.

In accordance with an embodiment of the present invention, a portable terminal is an electronic device that allows for easy carriage. The term "portable terminal" covers a broad range of terminals including a video phone, a portable phone, a smart phone, an International Mobile Telecommunication 2000 (IMT-2000) terminal, a Wideband Code Division Multiple Access (WCDMA) terminal, a Universal Mobile Telecommunication System (UMTS) terminal, a Personal Digital Assistant (PDA), a Portable Multimedia Player (PMP), a Digital Multimedia Broadcasting (DMB) terminal, an e-book reader, a portable computer such as a laptop, a tablet, etc., and a digital camera.

FIG. 1 is a block diagram of a portable terminal according to an embodiment of the present invention.

Referring to FIG. 1, the portable terminal includes a controller 101, a memory 103, a cover removal sensor 105, a power manager 107, a main battery 109, an auxiliary battery 111, a keypad 113, an audio processor 115, a wireless transceiver 117, and a display 119.

The wireless transceiver 117 includes a Radio Frequency (RF) unit and a MODEM. The RF unit may include an RF transmitter for upconverting the frequency of a transmission signal and amplifying the upconverted transmission signal and an RF receiver for low-noise-amplifying a received signal and downconverting the frequency of the low-noise-amplified signal. The MODEM may include a transmitter for encoding and modulating the transmission signal and a receiver for demodulating and decoding the signal received from the RF unit.

The audio processor 115 may include a CODEC having a data CODEC and an audio CODEC. The data CODEC processes packet data, and the audio CODEC processes voice and an audio signal of a multimedia file. The audio processor 115 may reproduce a digital audio signal received from the MODEM by converting the digital audio signal to an analog signal through the audio CODEC or may convert an analog audio signal generated from a microcomputer to a digital audio signal through the audio CODEC and transmit the digital audio signal to the MODEM. While the CODEC has been described as included in the audio processor 115, the CODEC may be configured separately or incorporated into the controller 101.

The keypad 113 may include alphanumeric keys for entering numbers and characters and function keys for setting various function, or a touchpad. If the display 119 is configured with a capacitive or resistive touch screen, the keypad 113 may include a minimum number of predetermined keys, and the display 119 may take over a part of the key input function of the keypad 113.

The memory 103 may include a program memory and data memories. The program memory stores a program for controlling the common functions of the portable terminal. The memory 103 may further include an external memory such as a Compact Flash (CF), a Secure Digital (SD), a Micro Secure Digital (Micro-SD), a Mini Secure Digital (Mini-SD), an Extreme Digital (xD), and a memory stick. The memory 103 may include a disk such as a Hard Disk Drive (HDD) and a Solid State Disk (SSD). Further, the memory 103 stores the history of a service that the portable terminal is executing, upon request of the controller 101 and retrieves the stored service history upon request of the controller 101.

Herein, the service may be any of various services that can be provided by the portable terminal. For example, the service may be an application, a camera service, a DMB service, a call service, a communication service through a $3^{rd}$ Generation (3G) network or Wireless Fidelity (Wi-Fi), a video play service, a sound source play service, or a game service, which is provided in the portable terminal.

The cover removal sensor 105 is provided on a cover covering the main battery 109 or on a bottom plate of the cover. Upon sensing a removal of the cover, the cover removal sensor 105 outputs a cover removal notification signal to the controller 101, indicating the removal of the cover. The cover removal sensor 105 may include a switch, an optical sensor, or a touch sensor. The display 119 may be configured with a Liquid Crystal Display (LCD) or an Organic Light Emitting Diode (OLED) (e.g. a Passive-Matrix OLED (PMOLED) or Active-Matrix OLED (AMOLED)). The display 119 outputs various types of display information generated in the portable terminal The display 119 may include a capacitive or resistive touch screen, to thereby serve as an input unit for controlling the portable terminal, along with the keypad 113.

The power manager 107 controls charging of the main battery 109 with power (e.g. a charging current value) received through a Travel Adapter (TA) or a Universal Serial Bus (USB) cable and supplies power received from the main battery 109 or the auxiliary battery 111 to each component of the portable terminal. The power manager 107 may also output information about the charged state and temperature of the main battery 109 to the controller 101. The power manager 107 switches a power supply source from the main battery 109 to the auxiliary battery 111 or from the auxiliary battery 111 to the main battery 109 under the control of the controller 101. Especially, the power manager 107 periodically measures the voltage of the main battery 109 and outputs the voltage measurement to the controller 101. In alternate embodiment, the power manager 107 may be incorporated into the controller 101.

The main battery 109 is detachably mounted to the portable terminal. The main battery 109 has a larger capacity than the auxiliary battery 111 and, when the portable terminal is powered on, provides power to each component of the portable terminal. The auxiliary battery 111 has a capacity of about 1 mA or below. When the portable terminal is powered off, the auxiliary battery 111 supplies minimum power required for the controller 101 to update time information to the controller 101 and is charged with power supplied by the main battery 109. In the embodiment, even though the portable terminal is not powered off, the auxiliary battery 111 supplies power to each component of the portable terminal under the control of the controller 101.

The controller 101 provides overall control to the portable terminal. The controller 101 may switch and control an operation of the portable terminal according to a user input received through the keypad 113 or the display 119. Especially, upon receipt of the cover removal notification signal from the cover removal sensor 105, the controller 101 transitions the portable terminal from a current operation mode to sleep mode and outputs a battery switch signal to the power manager 107, commanding switching of a power supply source from the main battery 109 to the auxiliary battery 111. The sleep mode is a mode that minimizes the power consumption of the portable terminal, and the controller 101 may maintain the sleep mode for about 30 minutes by receiving power from the auxiliary battery 111.

The controller 101 receives the voltage of the main battery 109 periodically from the power manager 107 and determines whether the main battery 109 has been replaced based on the voltage of the main battery 109. For example, if the received voltage of the main battery 109 has risen from 0V to 3V, the controller 101 may determine that the main battery 109 has been replaced. On the other hand, if the voltage of the main battery 109 is kept to be 0V for a predetermined time period, the controller 101 determines that the main battery 109 has not been replaced. The predetermined time period is a time sufficient for replacing the main battery 109. The predetermined time may be within a range from 10 seconds to 30 seconds.

If the controller 101 determines that the main battery 109 has been replaced, the controller 101 outputs a battery switch signal to the power manager 107, commanding switching of the power supply source from the auxiliary battery 111 to the main battery 109. Then, the controller 101 transitions the portable terminal from the sleep mode to active mode.

Upon receipt of the cover removal notification signal, the controller 101 may also store the service history of a current on-going service in the memory 103. After the main battery 109 has completely been replaced, the controller 101 may resume the service for a user according to the stored service history.

As the controller 101 operates in the above manner, the main battery 109 can be replaced even though the user does not power off the portable terminal. In addition, despite the replacement of the main battery 109, the controller 101 can continuously provide a service executed before the battery replacement to the user.

While devices such as a Bluetooth module, a Global Positioning System (GPS) module, a camera module, a Wi-Fi module, an acceleration sensor, a proximity sensor, a geomagnetic sensor, and a DMB receiver are not shown in FIG. 1 although they can be included in the portable terminal, those skilled in the art will understand that these devices can be provided in the portable terminal and perform their functions.

For example, the acceleration sensor senses the movement state of the portable terminal by measuring the dynamic force of the portable terminal such as acceleration, vibration, impact, etc. for use in sensing the display direction of the display of the portable terminal. The proximity sensor senses the proximity of a body part of a user with respect to the portable terminal, for use in preventing malfunction of the portable terminal that provides a touch screen function. In addition, a gyroscope observes a kinetic motion of a rotating portable terminal, for use in sensing rotational motions of the portable terminal along six axes, that is, up and down, sideways, back and forth, x-axis, y-axis, and z-axis rotational motions in conjunction with the acceleration sensor. The portable terminal may further include a camera module for capturing an image (a video or a still image). During capturing of an image, position information acquired using the GPS module may be inserted into the captured image so that the user can identify a position at which the photo has been taken.

Figure 2:
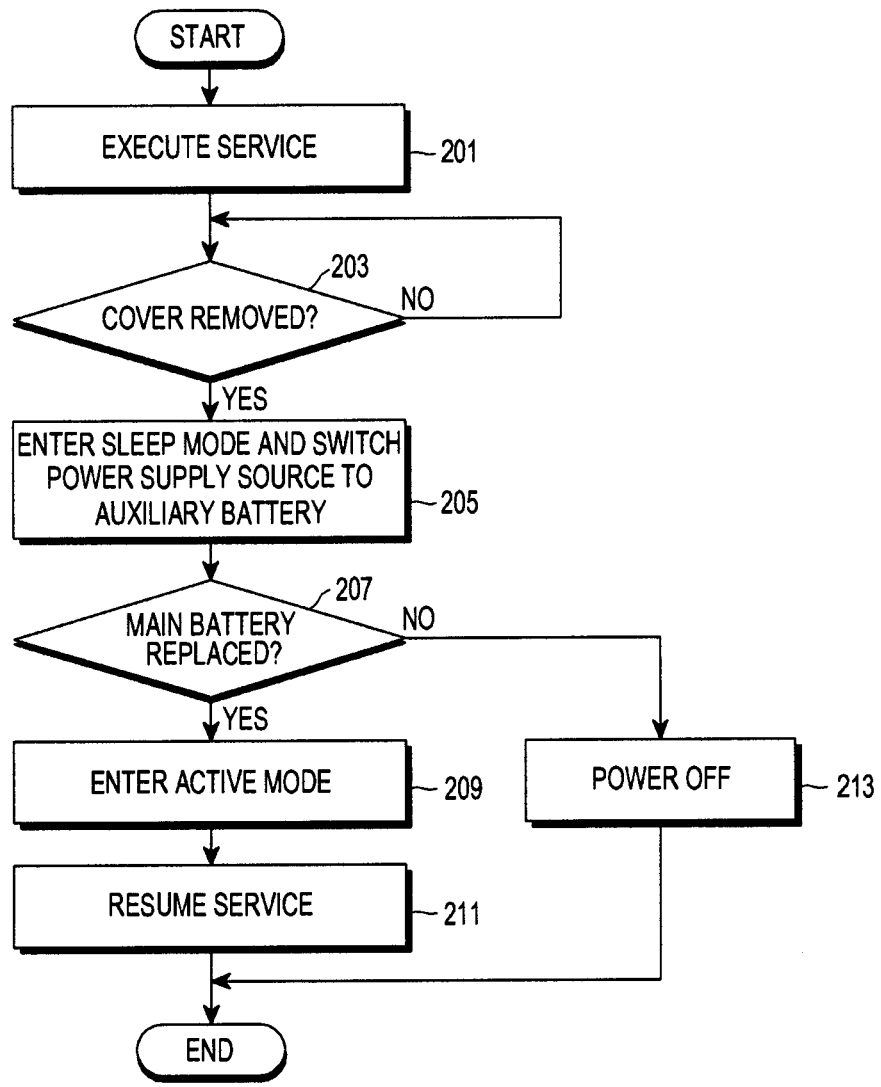
FIG. 2 is a flowchart illustrating an operation for replacing a battery in the portable terminal according to an embodiment of the present invention.

FIG. 2 is a flowchart illustrating an operation for replacing a battery in the portable terminal according to an embodiment of the present invention.

Referring to FIG. 2, the controller 101 executes a service selected by a user or a service scheduled to be executed at a predetermined time in step 201. The service refers to any service that can be provided by the portable terminal. For example, the service may be an application, a camera service, a DMB service, a call service, a communication service through a 3G network or Wi-Fi, a video play service, a sound source play service, or a game service, which is provided in the portable terminal.

In step 203, the controller 101 determines whether the cover has been removed from the main battery 109 without power-off of the portable terminal If the cover has been removed, the controller 101 proceeds to step 205 and otherwise, the controller 101 repeats step 203. Upon receipt of a cover removal notification signal from the cover removal sensor 105, the controller 101 determines that the cover has been removed. If the controller 101 has not received the cover removal notification signal from the cover removal sensor 105, the controller 101 determines that the cover still covers the main battery 109.

In step 205, the controller 101 stores the history of a current on-going service in the memory 103, transitions the portable terminal from its current operation mode to the sleep mode, and switches the power supply source from the main battery 109 to the auxiliary battery 111. Here, the history of a current on-going service may include a name of the internet application or other application and/or a specific web site address that a user was surfing prior to the transition, so that the user can resume back to the same program or site prior to the sleep mode transition.

The sleep mode refers to a mode that minimizes the power consumption of the portable terminal.

In step 207, the controller 101 determines whether the main battery 109 has been replaced. If the controller 101 determines that the main battery 109 has been replaced, the controller 101 goes to step 209. On the other hand, if the controller 101 determines that the main battery 109 has not been replaced for a predetermined time period, the controller 101 goes to step 213. The controller 101 may monitor whether the main battery 109 has been replaced or not based on the voltage of the main battery 109 periodically output from the power manager 107. Herein, the predetermined time period is a time sufficient for the user to replace the main battery 109, within a range from 10 seconds to 30 seconds.

For example, if the received voltage of the main battery 109 has risen from 0V to 3V, the controller 101 may determine that the main battery 109 has been replaced. On the other hand, if the voltage of the main battery 109 is maintained to be 0V for a predetermined time period, the controller 101 determines that the main battery 109 has not been replaced.

In step 213, the controller 101 powers off the portable terminal.

Meanwhile, the controller 101 switches the power supply source from the auxiliary battery 111 to the main battery 109 and transitions the portable terminal from the sleep mode to the active mode in step 209.

After step 209, the controller 101 retrieves the service history from the memory 103 and resumes the service executed before the battery replacement using the service history in step 211. Here, the service history includes a name of the service or application and a specific web site. For example, when the removal notification signal is received during a web surfing by using an internet application, the controller 101 stores the service history, which includes a name of the internet application and a web site address in respect to the web surfing.

As the controller 101 performs steps 201 to 213 in this manner, the main battery 109 can be replaced without the need for power-off of the portable terminal. Further, even though the main battery 109 has been replaced, the controller 101 can continuously provide the user with a service that was executed before the battery replacement.

Figure 3:
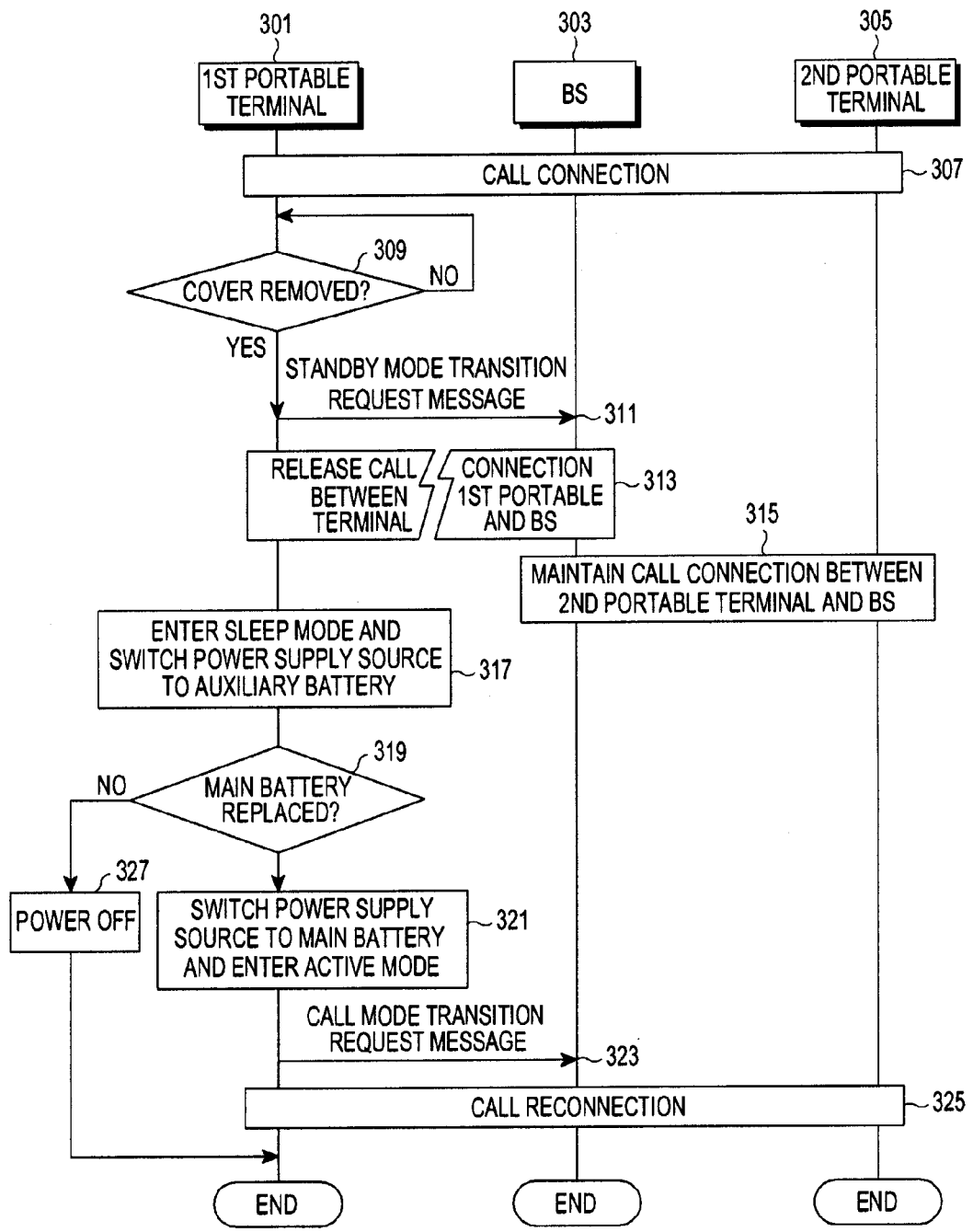
FIG. 3 is a flowchart illustrating an operation for replacing a battery in a portable terminal in a communication system according to another embodiment of the present invention.

FIG. 3 is a flowchart illustrating an operation for replacing a battery in a portable terminal in a communication system according to another embodiment of the present invention.

With reference to FIG. 3, a description will be given of an operation in which a first portable terminal 301 replaces the main battery 101 without power-off, while performing a call service with a second portable terminal 305 through a Base Station (BS) 303. Before describing the operation, it is assumed that the first portable terminal 301 has the same configuration as illustrated in FIG. 1.

The first portable terminal 301 establishes a call connection with the second portable terminal 305 through the BS 303 in step 307 and determines whether the cover has been removed from the main battery 109 in step 309. If the cover has been removed, the first portable terminal 301 proceeds to step 311 and otherwise, the portable terminal 301 repeats step 309.

In step 311, the first portable terminal 301 transmits a standby mode transition request message to the BS 303, requesting transitioning of call mode to standby mode between the first and second portable terminals 301 and 305. The call mode refers to a mode in which a call is conducted between the first and second portable terminals 301 and 305, and the standby mode refers to a mode in which one of the first and second portable terminals 301 and 305 waits for a call with the other party.

The BS 303 releases the call connection from the first portable terminal 301 in step 313, while maintaining the call connection with the second portable terminal 305.

In step 317, the first portable terminal 301 transitions the first portable terminal 301 to the sleep mode and switches the power supply source from the main battery 109 to the auxiliary battery 111. The sleep mode refers to a mode that minimizes the power consumption of the portable terminal.

In step 319, the first portable terminal 301 determines whether the main battery 109 has been replaced. If the first portable terminal 301 determines that the main battery 109 has been replaced, the first portable terminal 301 goes to step 321. On the other hand, if the first portable terminal 301 determines that the main battery 109 has not been replaced for a predetermined time period, the first portable terminal 301 goes to step 327. Herein, the predetermined time period is a time sufficient for the user to replace the main battery 109, within a range from 10 seconds to 30 seconds.

In step 327, the first portable terminal 301 powers off itself.

Meanwhile, the first portable terminal 301 switches the power supply source from the auxiliary battery 111 to the main battery 109 and transitions the first portable terminal 301 from the sleep mode to the active mode in step 321.

After step 321, the first portable terminal 301 transmits a call mode transition request message to the BS 303, requesting transitioning of the standby mode to the call mode between the first and second portable terminals 301 and 305 in step 323.

In step 325, the BS 303 reconnects the call between the first and second portable terminals 305, thus re-establishing the call connection between them.

Figure 4:
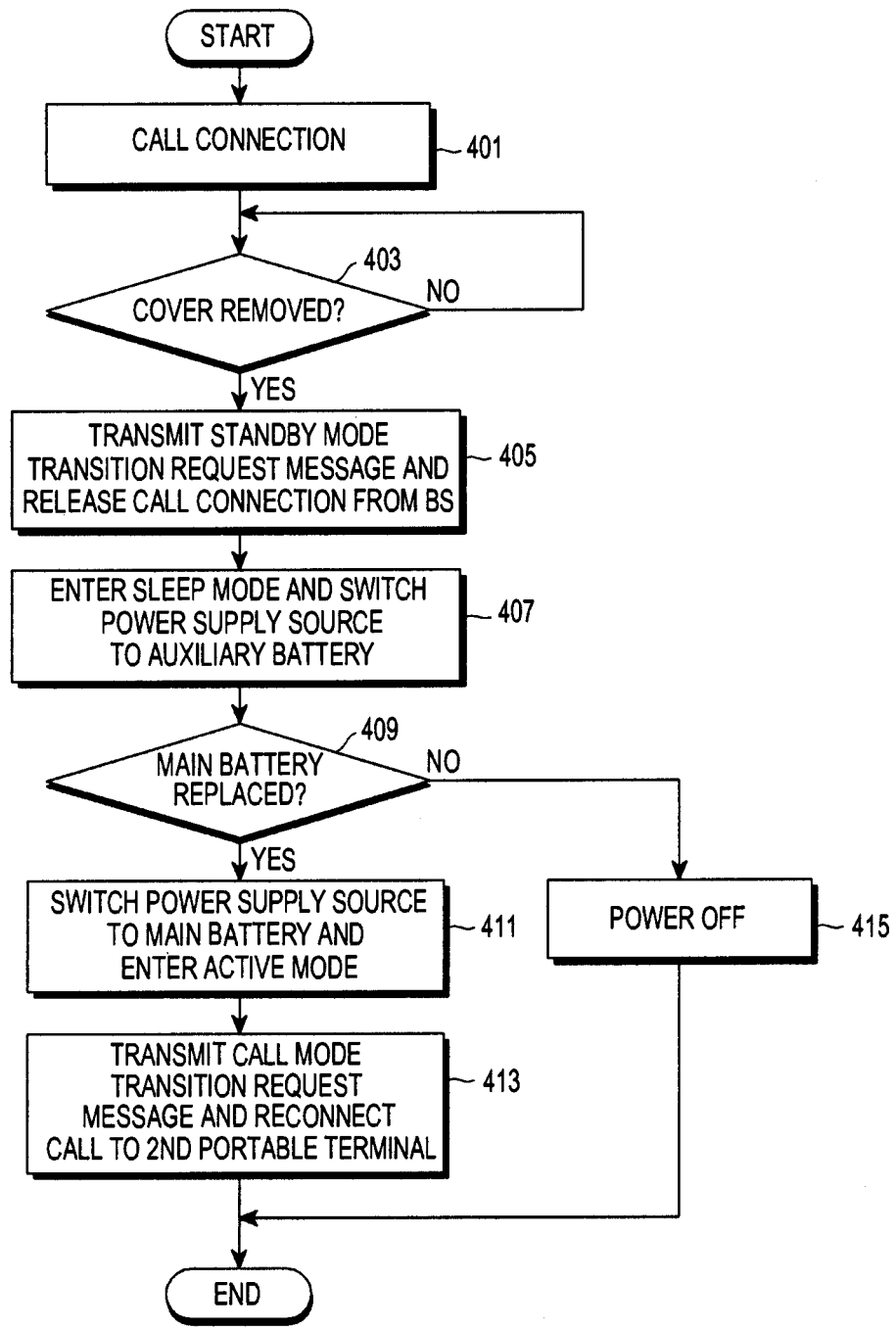
FIG. 4 is a flowchart illustrating an operation of the portable terminal for replacing the battery according to the embodiment of the present invention illustrated in FIG. 3.

FIG. 4 is a flowchart illustrating an operation of the portable terminal for replacing the battery according to the embodiment of the present invention illustrated in FIG. 3

Referring to FIG. 4, the first portable terminal 301 establishes a call connection with the second portable terminal 305 through the BS 303 in step 401 and determines whether the cover has been removed from the main battery 109 in step 403. If the cover has been removed, the first portable terminal 301 proceeds to step 405 and otherwise, the portable terminal 301 repeats step 403.

In step 405, the first portable terminal 301 transmits a standby mode transition request message to the BS 303, requesting transitioning of the call mode to the standby mode between the first and second portable terminals 301 and 305 and releases the call connection from the BS 303.

In step 407, the first portable terminal 301 transitions to the sleep mode and switches the power supply source from the main battery 109 to the auxiliary battery 111.

In step 409, the first portable terminal 301 determines whether the main battery 109 has been replaced. If the first portable terminal 301 determines that the main battery 109 has been replaced, the first portable terminal 301 goes to step 411. On the other hand, if the first portable terminal 301 determines that the main battery 109 has not been replaced for a predetermined time period, the first portable terminal 301 goes to step 415.

In step 415, the first portable terminal 301 powers off itself.

Meanwhile, the first portable terminal 301 switches the power supply source from the auxiliary battery 111 to the main battery 109 and transitions from the sleep mode to the active mode in step 411.

After step 411, the first portable terminal 301 transmits a call mode transition request message to the BS 303, requesting transitioning of the standby mode to the call mode between the first and second portable terminals 301 and 305 in step 413. Then, the first portable terminal 301 reestablishes the call connection with the second portable terminal 305.

As the first portable terminal 301 performs steps 401 to 415 in this manner, it can allow for replacement of the main battery 109 without power-off during a call with the second portable terminal. In addition, since the first portable terminal 301 reconnects the call to the second portable terminal 305 as soon as the main battery 109 has been completely replaced, the replacement of the main battery 109 is possible, without terminating the call service.

Figure 5:
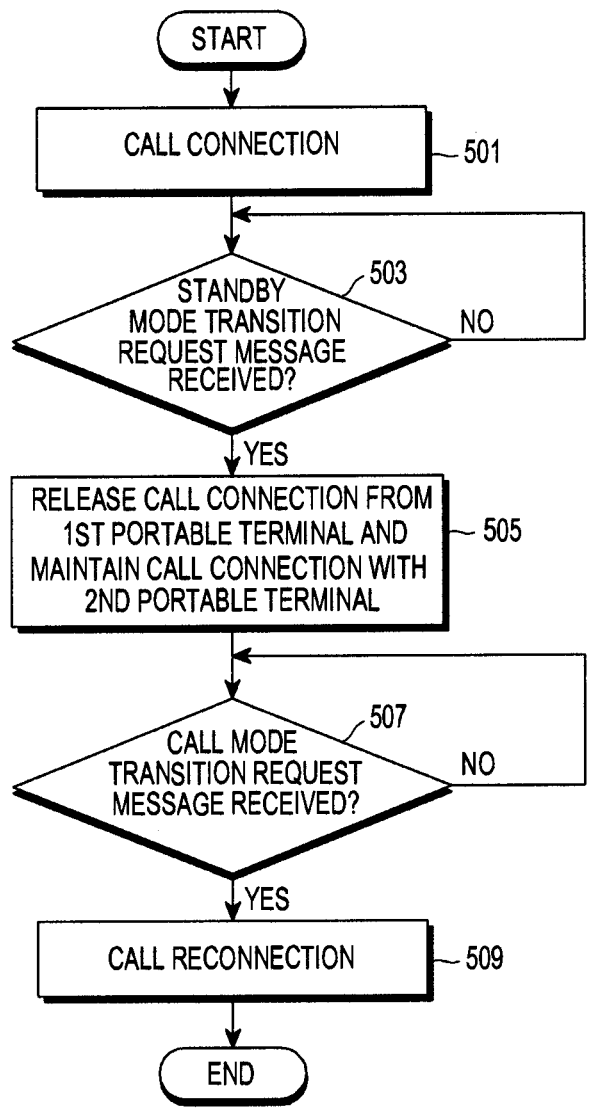
FIG. 5 is a flowchart illustrating an operation of a Base Station (BS) for reconnecting a call after the battery of the portable terminal is replaced according to the embodiment of the present invention illustrated in FIG. 3.

FIG. 5 is a flowchart illustrating an operation of the BS for reconnecting a call after the battery of the portable terminal is replaced according to the embodiment of the present invention illustrated in FIG. 3.

Referring to FIG. 5, the BS 303 establishes a call connection between the first and second portable terminals 301 and 305 in step 501 and determines whether a standby mode transition request message has been received from the first portable terminal 301 in step 503. Upon receipt of the standby mode transition request message, the BS 303 proceeds to step 505 and otherwise, the BS 303 repeats step 503.

In step 505, the BS 303 releases the call connection from the first portable terminal 301, while maintaining the call connection with the second portable terminal 305 from which the call connection to the first portable terminal 301 has been released.

The BS 303 determines whether a call mode transition request message has been received from the first portable terminal 301 in step 507. Upon receipt of the call mode transition request message, the BS 303 proceeds to step 509 and otherwise, the BS 303 repeats step 507.

In step 509, the BS 303 reconnects the call between the first and second portable terminals 301 and 305, thus re-establishing the call connection between them.

Additionally, the BS 303 maintains the call connection with the second portable terminal 305 for a predetermined time period. If the call mode transition request message has not been received from the first portable terminal 301 for the predetermined time period, the BS 303 may release the call connection from the second portable terminal 305. The predetermined time period represents a duration sufficient for replacing the main battery 109. For example, the predetermined time period may be within a range from 10 seconds to 30 seconds.

As the BS 303 performs steps 501 to 509 in this manner, even though the main battery 109 has been replaced, an on-going service can continue between the first and second portable terminals 301 and 305.

As is apparent from the above description of the present invention, since power is supplied through an auxiliary battery during battery replacement, a battery can be replaced without the need for power-off of a portable terminal.

Further, the service history of a specific service being executed before the battery replacement is stored so that the specific service may continue in spite of the battery replacement of the portable terminal.

While the present invention has been particularly shown and described with reference to embodiments thereof, they are purely exemplary. For example, while it has been described above that a call service is continuously provided even though a battery is replaced in a portable terminal during the call service in progress, the same thing is applicable to a DMB service, a Wi-FI service, a game service, a camera function, a music play function, a video playback function, etc.

Therefore, it will be understood by those of ordinary skill in the art that various changes in form and details may be made therein without departing from the spirit and scope of the present invention as defined by the following claims.

What is claimed is:

1. An apparatus for replacing a battery in a portable terminal, comprising:
   a main battery:,
   an auxiliary battery;
   a cover removal sensor for sensing a removal of a battery cover ; and
   a controller for, in response to the battery cover removal, controlling to be switched from the main battery to the auxiliary battery for supplying a power;
   wherein the auxiliary battery supplies the power to some component of the portable terminal under the control of the controller, and
   the cover removal sensor generates a cover removal notification signal when the removal of the battery cover is sensed, and upon receipt of the cover removal notification signal during a call service, the controller transmits a standby mode transition request to a base station requesting transitioning of the portable terminal from a call mode to a standby mode.

2. The apparatus of claim 1, wherein when the portable terminal transitions from the sleep mode to a active mode, the controller transmits a call mode transition request to the base station requesting transition from the standby mode of the portable terminal to the call mode.

3. The apparatus of claim 2, wherein the controller resumes the call service with the portable terminal in communication with another portable terminal.

4. A method for replacing a battery in a portable terminal, comprising:
   sensing a removal of a battery cover;
   generating a cover removal notification signal when the removal of the battery cover is sensed;
   transmitting a standby mode transition request to a base station requesting transitioning of the portable terminal to a standby mode in response to the cover removal notification signal during a call service; and
   transmitting a call mode transition request to the base station requesting transitioning from the standby mode to the call mode when the portable terminal transitions from the sleep mode to the active mode,
   in response to the battery cover removal, controlling to be switched from the main battery to the auxiliary battery for supplying a power:
   wherein the auxiliary battery supplies the power to some component of the portable terminal under the control of the controller.

5. The method of claim 4, further comprising resuming the call service with another portable terminal in communication with the portable terminal.

* * * * *

UNITED STATES PATENT AND TRADEMARK OFFICE
CERTIFICATE OF CORRECTION

| | |
|---|---|
| PATENT NO. | : 8,660,619 B2 |
| APPLICATION NO. | : 13/495294 |
| DATED | : February 25, 2014 |
| INVENTOR(S) | : Kwang-Min Kil et al. |

Page 1 of 1

It is certified that error appears in the above-identified patent and that said Letters Patent is hereby corrected as shown below:

In the Claims

Column 8, Claim 1, Lines 53-54 should read as follows:
--...a main battery; an...--

Column 9, Claim 4, Lines 26-27 should read as follows:
--...supplying a power; wherein...--

Signed and Sealed this
Thirteenth Day of May, 2014

Michelle K. Lee
*Deputy Director of the United States Patent and Trademark Office*